Oct. 20, 1925.
L. SCHLAGER
1,557,884
BAKER'S PEEL
Filed July 14, 1924
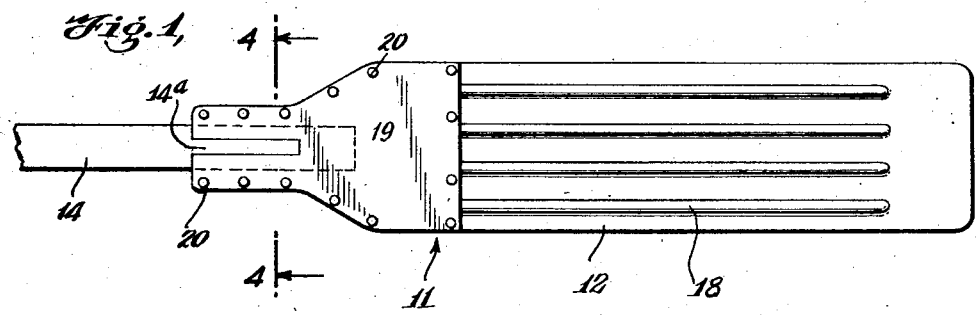
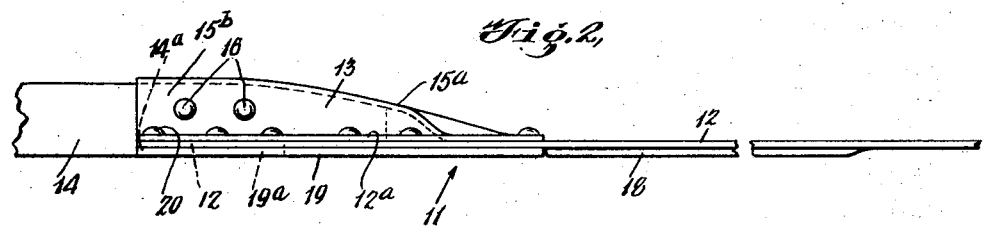
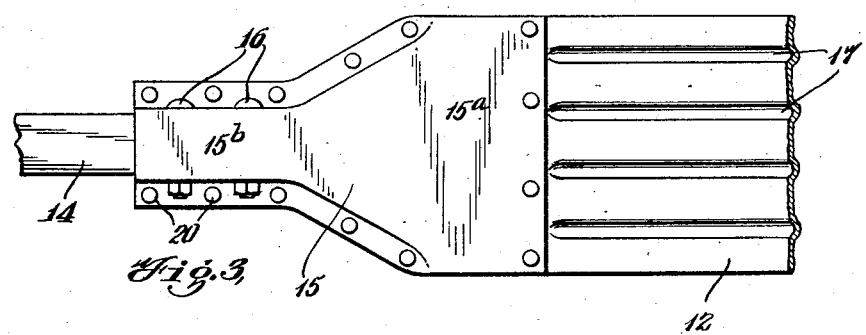
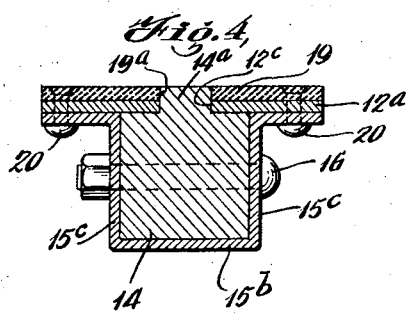
INVENTOR
LEON SCHLAGER
BY
ATTORNEY Patented Oct. 20, 1925.

1,557,884

UNITED STATES PATENT OFFICE.

LEON SCHLAGER, OF NEW YORK, N. Y.

BAKER'S PEEL.

Application filed July 14, 1924. Serial No. 725,769.

*To all whom it may concern:*

Be it known that LEON SCHLAGER, citizen of the United States, residing at New York city, in the county of Bronx and State of New York, has invented certain new and useful Improvements in Bakers' Peels, of which the following is a specification.

This invention relates to improvements in bakers' peels.

An object of the invention is the provision of an implement of the character described constructed principally of metal and which is designed to slide in and out of the oven easily and without objectionable noise.

Another object of the invention is the provision of an implement of the character described which is constructed of few, simple and durable parts, which is relatively inexpensive to manufacture and which is efficient and practical to a high degree.

Other objects of the invention will in part be obvious and in part hereinafter pointed out.

The invention accordingly consists in the features of construction, combinations of elements and arrangement of parts which will be exemplified in the construction hereinafter described and of which the scope of application will be indicated in the following claims.

In the accompanying drawing, in which is shown one of the various possible illustrative embodiments of this invention, Fig. 1 is a bottom plan view of a baker's peel embodying this invention;

Fig. 2 is a side elevational view of the peel shown in Fig. 1;

Fig. 3 is a fragmentary top plan view of the handle socket portion of the peel; and Fig. 4 is a cross-sectional view taken on line 4—4 of Fig. 1.

Referring in detail to the drawing, the peel is seen to consist of a blade 11 made preferably of light sheet metal such as aluminum, having a blade body 12 and a socket 13 formed at one end thereof into which a suitable handle 14 is secured. The socket 13 preferably comprises a socket forming member 15 having a forwardly sloping or tapering ramp portion $15^a$ and a rear handle holder portion $15^b$ of U-shaped cross-section riveted to a rearwardly extending section $12^a$ of the blade body 12 as shown in Figs. 2 and 4. One or more bolts 16 may be passed through the upstanding walls $15^c$ of holder portion $15^b$ and the end portion of handle 14 inserted in the socket 13 to rigidly secure the handle 14 against accidental removal.

The upper surface of the blade body 12 is provided with spaced parallel longitudinal grooves 17 preferably formed by tamping so as to form corresponding corrugations 18 on the underside. These latter stiffen the blade and at the same time the raised corrugations 18 form runners whereon the peel may easily slide in and out of the oven. A sheet 19 of fibre or like material corresponding substantially in thickness to the height of the corrugations 18 and abutting the ends thereof, is mounted on the section $12^a$ of blade body 12 to form a smooth facing therefor, and is preferably secured to the blade by rivets 20 which hold the member 15 to said section $12^a$ as shown in Figs. 2 and 4.

The socket 13 is preferably formed to permit the contraction of the walls $15^c$ of holder portions $15^b$ when bolts 16 are tightened to take up any looseness of fit of the handle 17 in the socket 13 due to drying out of the former or for any other cause. For this purpose section $12^c$ of blade body 12 and sheet 19 have a longitudinal slotted opening at $19^a$ and $12^b$ into which a raised portion $14^a$ on handle 14 is fitted as shown in Figs. 2 and 4.

It is apparent from the above description and drawing that the peel provides for easy and convenient manipulation thereof in and out of the oven. Since the exposed surface of the fibre sheet becomes very smooth and tough in use, it serves as an efficient antifriction means for sliding thereon which is practically noiseless. Also the ramp portions $15^a$ of member 15 which has a relatively long slope toward the front end of the blade acts to smoothly retard the bake on loading thereof thus preventing a tendency to accidentally tip off the blade and obviously aids in unloading the bake from the rear end thereof.

It should be noted that the blade 11 may be made of cast metal but is preferably constructed of rolled sheet members stamped into shape which are stronger and more durable than relatively thin castings, especially when formed from aluminum or the like metals.

It will thus be seen that there is provided a device in which the several objects of this invention are achieved and which is well adapted to meet the conditions of practical use.

As various possible embodiments might be made of the above invention and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:—

1. A baker's peel comprising a blade and a handle therefor, the bottom side of the blade being provided with sliding surfaces formed partly on metallic and partly on non-metallic blade portions.

2. In a baker's peel, a blade having a metallic body portion and a non-metallic sheet secured on the bottom side thereof, the bottom side of said portion and sheet providing sliding surfaces for freely sliding the peel in and out of the oven without objectionable noise.

3. In a baker's peel, a blade comprising a body portion, a holder member mounted on an upper extended section thereof, and members forming therewith a socket adapted to secure therein a handle, and a non-metallic sheet fastened on the bottom side of said section.

4. In a baker's peel, a blade comprising a body portion, a holder member mounted on an upper extended section fastened to an extended upper section of said body portion, said member having a forwardly sloping ramp to facilitate the loading and unloading of the bake from the rear end of the blade, and having a rear holder portion forming with said section a socket adapted to secure therein a handle.

5. A baker's peel comprising a blade having a body portion, a member fastened to an extended section thereof and forming therewith a socket, a handle for the peel fitted in said socket, said section of the body portion being slotted to permit the clamping means to contract the members to eliminate looseness of fit between the socket and the handle.

6. A baker's peel comprising a blade having a metallic body portion and a non-metallic sheet secured to the bottom side of an extended section thereof, the bottom side of said portion and sheet providing sliding surfaces for freely sliding the peel in and out of the oven, a member fastened to the upper side of the extended section and forming therewith a socket, a handle for the peel fitted in said socket, and means for clamping the handle in the socket to prevent accidental displacement therefrom, said extended section and sheet being slotted to permit the clamping means to contract the socket to eliminate looseness of fit between the latter and the handle.

7. A baker's peel comprising a blade having a metallic body portion, longitudinal runners formed on the bottom side thereof, and a non-metallic sheet secured to an extended section of the body portion adjacent said runners, said sheet and runners providing sliding surfaces for freely sliding the peel in and out of the oven without objectionable noises, a member fastened to the upper side of the extended section, said member having a forwardly sloping ramp to facilitate the loading and unloading of the bake from the rear end of the blade and having a rear holder portion forming with said section a socket and a handle for the socket.

8. A baker's peel comprising a blade having a metallic body portion, longitudinal runners formed on the bottom side thereof, and a non-metallic sheet secured to an extended section of the body portion adjacent said runners, said sheet and runners providing sliding surfaces for freely sliding the peel in and out of the oven without objectionable noises, a member fastened to the upper side of the extended section, said member having a forwardly sloping ramp to facilitate the loading and unloading of the bake from the rear end of the blade and having a rear holder portion forming with said section, a socket and a handle for the socket, and means for clamping the handle in the socket to prevent accidental displacement therefrom, said extended section and sheet being slotted to permit the clamping means to contract the socket to eliminate looseness of fit between the latter and the handle.

In testimony whereof I affix my signature.

LEON SCHLAGER.